(12) United States Patent
Huang (10) Patent No.: US 7,568,559 B2
(45) Date of Patent: Aug. 4, 2009

(54) BRAKING DEVICE FOR A POWER WINCH

(76) Inventor: Shih Jyi Huang, No. 19, Alley 6, Lane 325, Chien Kang Road, Taipei (TW)

( * ) Notice: Subject to any disclaimer, the term of this patent is extended or adjusted under 35 U.S.C. 154(b) by 385 days.

(21) Appl. No.: 11/476,860

(22) Filed: Jun. 29, 2006

(65) Prior Publication Data

US 2008/0000734 A1    Jan. 3, 2008

(51) Int. Cl.
*F16D 55/08* (2006.01)
*F16D 65/14* (2006.01)
(52) U.S. Cl. .................. 188/72.7; 254/347; 254/375
(58) Field of Classification Search ............ 188/71.1, 188/72.7, 82.9, 171; 254/347, 362, 375, 254/378

See application file for complete search history.

(56) References Cited

U.S. PATENT DOCUMENTS

| | | | | |
|---|---|---|---|---|
| 3,994,376 A | * | 11/1976 | Fulghum | 192/223.3 |
| RE36,216 E | * | 6/1999 | Telford | 254/375 |
| 6,520,486 B2 | * | 2/2003 | Huang | 254/347 |
| 2002/0197104 A1 | * | 12/2002 | Bauman et al. | 403/274 |

* cited by examiner

*Primary Examiner*—Melody M Burch
(74) *Attorney, Agent, or Firm*—Bacon & Thomas, PLLC (57) ABSTRACT

A braking device for a power winch includes a reduction box disposed in the interior with a sectional shaft, an elastic member, a braking lining, a first engraved block, a second engraved block and a clutch base. The braking lining is an independent component assembled and positioned in the accommodating hollow of the reduction box. Only when the motor stops operating and the power winch carries out braking, may the braking lining cause wear, able to prolong the service life and elevate effect in use, and convenient in replacing.

4 Claims, 6 Drawing Sheets

BRAKING DEVICE FOR A POWER WINCH

BACKGROUND OF THE INVENTION

1. Field of the Invention

This invention relates to a braking device for a power winch, particularly to one having a braking lining provided independently, able lessen wear and prolong service life of the braking lining, having great beneficial result in use and convenient in replacing of the braking lining.

2. Description of the Prior Art

Generally, a braking device for a power winch must be able to stop the motor timely and carry out braking instantly whether the power winch is motionless and not in use or is slinging up and lowering down heavy loads. However, when a conventional power winch is normally driven by a motor to hoist or lower the steel rope (whether there is heavy loads hung thereon), the braking action will automatically be released for smoothly hoisting and lowering the steel rope. A braking device for a power winch, as disclosed in a U.S. Pat. No. 6,520,486, titled "BRAKING DEVICE FOR MOTIVE WINCH", which was a patent of the inventor of the present invention, includes a reduction box provided therein with a sectional shaft, an elastic member, a first engraved block, a second engraved block and a clutch base. The first engraved block is fitted on the sectional shaft but unable to drive each other and has its outer circumferential edge secured with a braking lining able to contact with or disengage from the frictional surface preset in the reduction box. The elastic member is assembled on the first engraved block, able to produce proper reverse torsional force relative to the first engraved block; therefore, when the braking lining on the first engraved block is in a motionless state, it will be forced to push against the frictional surface formed in the reduction box, ready to carry out braking. The second engraved block is engaged with the sectional shaft for rotating synchronously. The first and the second engraved block are respectively formed with a different slope able to closely contact with each other for pushing the braking lining on the first engraved block to move and perform or release braking, and also respectively formed actuating projections to be actuated to rotate by the projecting blocks fixed on the inner side of the clutch base. The clutch base is driven to rotate by the motor spindle, which is inserted through the sectional shaft (but unable to drive each other) and has its outer end connected with the clutch base. Thus, when the motor is operated, its motor spindle will actuate the clutch base and the two engraved blocks to rotate together to let the braking lining move away from the frictional surface in the reduction box and release braking so as to enable the steel rope to be hoisted or lowered smoothly. When the motor stops operating, the reaction draw force coming from the heavy loads hung on the steel rope will force the slope of the second engraved block to push the slope of the first engraved block and actuate the first engraved block and the braking lining on its outer circumferential edge to move and closely contact with the frictional surface in the reduction box, thus attaining effect of braking.

By so designing, the braking device for a motive winch in this US patent has the following defects.

1. When the motor is operated, the clutch base will actuate the first and the second engraved block to rotate synchronously, and the braking lining assembled on the first engraved block will always be rotated together with the first engraved block, easy to cause wear to the braking lining.

2. The braking lining is firmly secured on the outer circumferential edge of the first engraved block; therefore, in case the braking lining has to be replaced with a new one, both the braking lining and the first engraved block have to be replaced together, inconvenient in use and not conforming to economic gain.

SUMMARY OF THE INVENTION

The objective of this invention is to offer a braking device for a winch, having a braking lining independently assembled and positioned in the accommodating hollow of a reduction box. Only when the braking lining carries out braking, may the braking lining cause wear, able to prolong the service life of the braking lining and enhance effect in use and also facilitating replacing of the braking lining.

The braking device for a power winch in the present invention includes a reduction box, a braking lining, a sectional shaft, an elastic member, a first engraved block, a sectional engraved block, a clutch base and a reduction box rear cover combined together.

The reduction box to be secured on a power winch is installed with a reduction gear set in the interior and bored with an accommodating hollow at one side and an insert hole in the center for a motor spindle to be inserted therethrough, with the reduction gear set received in the central insert hole.

The braking lining is assembled and positioned in the accommodating hollow of the reduction.

The sectional shaft is fitted on the motor spindle and inserted in the central insert hole of the reduction box. The sectional axle has the annular walls of its opposite ends respectively formed with teeth, and the teeth on the annular wall of one end that is inserted in the insert hole are engaged with the reduction gear set in the reduction box for rotating together.

The elastic member fitted on the sectional shaft has one end inserted and positioned in the hole of the sectional shaft.

The first engraved block is fitted on the sectional shaft, with the other end of the elastic member inserted and positioned in the first engraved block. The first engraved block is fixed with a protruding annular base on one side reverse to the elastic member, and the annular base is formed with plural corrugated slopes and has its opposite outer walls respectively disposed with an actuating projection. Further, the first engraved block has its outer circumferential edge formed with a frictional surface able to closely contact with the inner circumferential edge of the braking lining.

The second engraved block is formed with a central hole having its inner wall provided with teeth to be engaged with the teeth on the annular wall of the outer end of the sectional shaft. The second engraved block is provided with a slope and two actuating projections respectively corresponding with the slope and the actuating projections of the first engraved block, only there is slight angle error between the slopes and between the actuating projections.

The clutch base is bored with an engage hole in the center of its outer end for the outer end of the motor spindle to be engaged therein. The clutch base has its inner side disposed with two projecting members for pushing the actuating projections of the first and the second engraved block.

The reduction box rear cover is locked on the reduction box.

The braking lining is an independent component assembled and positioned in the accommodating hollow of the reduction box. When the motor stops operating, the first engraved block will be moved to have its frictional surface closely contacting with the braking lining to produce friction and carry out braking.

After received in the accommodating hollow of the reduction box, the braking lining has its inner edge pressed by a fixing member, which is locked on the inner side of the accommodating hollow for firmly positioning the braking lining.

The braking lining of the braking device could be divided into several blocks, which can be integrated to form a ring-shaped braking lining.

The braking lining of the braking device could be provided inside with a polygonal combining groove, and the accommodating hollow of the reduction box could be disposed inside with a polygonal combining base to be engaged with the polygonal groove of the braking lining so as to fix the braking lining in position.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
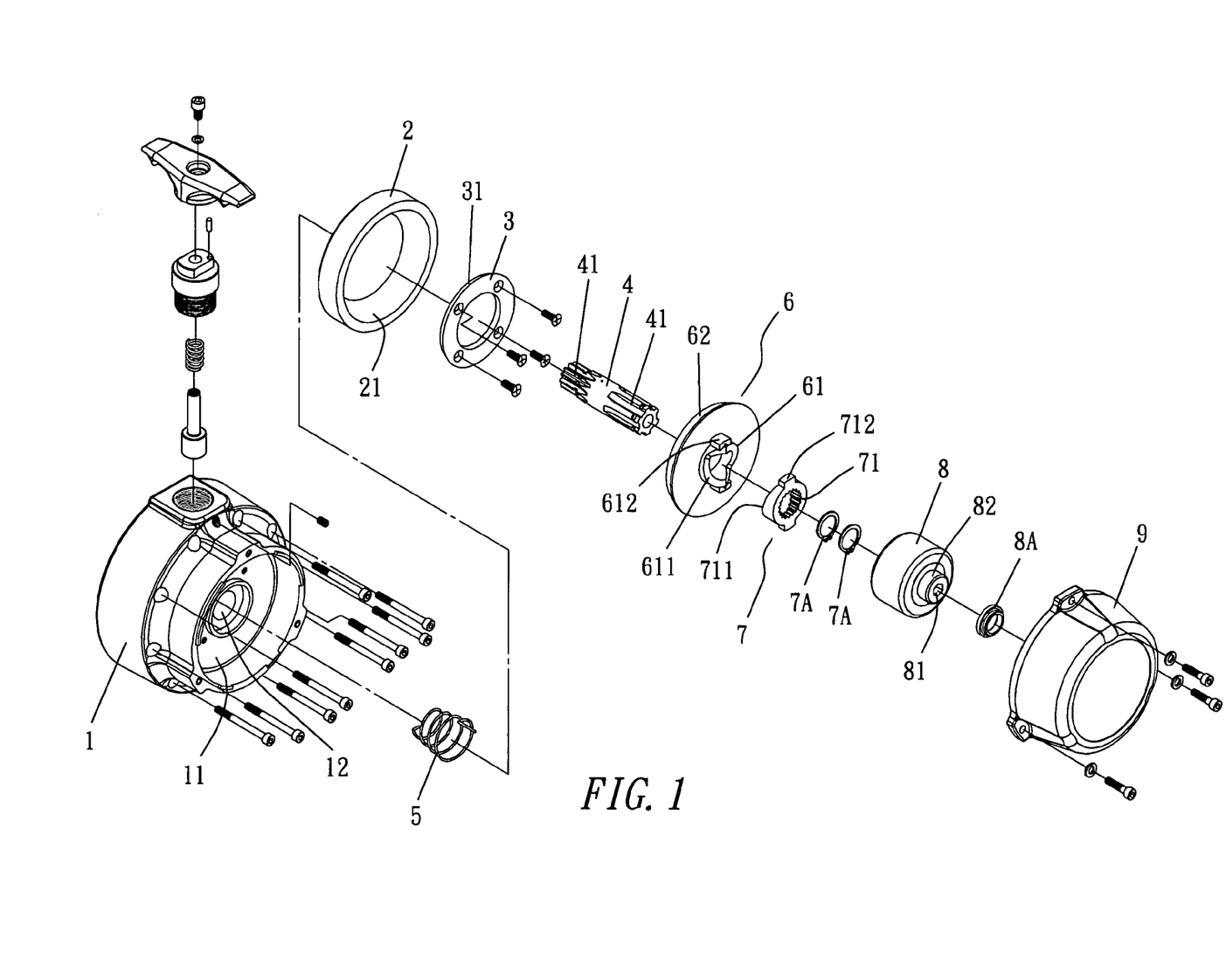
FIG. 1 is an exploded perspective view of a first preferred embodiment of a braking device for a power winch in the present invention.
Figure 2:
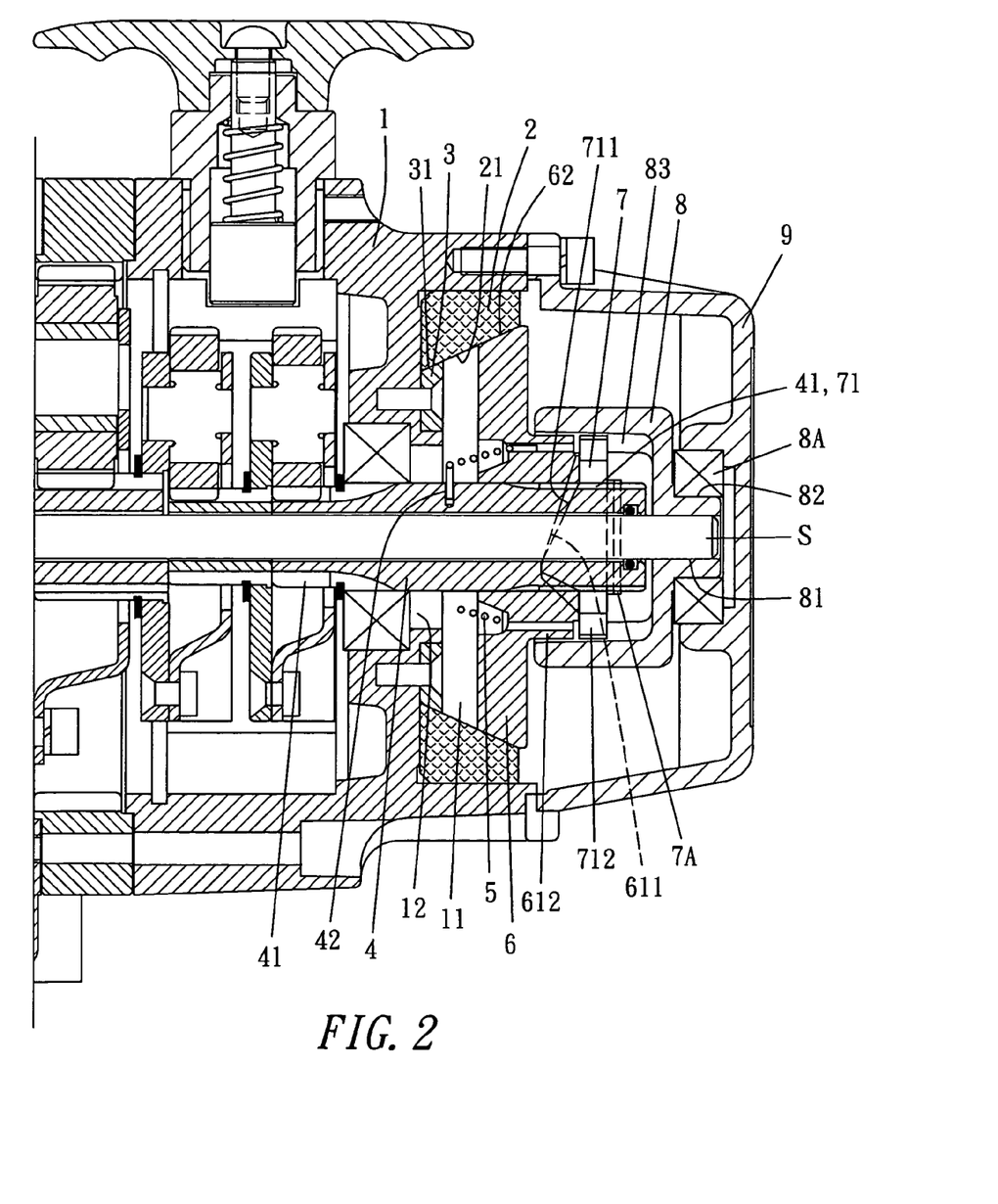
FIG. 2 is a cross-sectional view of the first preferred embodiment of the braking device for a power winch in the present invention.

A first preferred embodiment of a braking device for a power winch in the present invention, as shown in FIGS. 1 and 2, includes a reduction box 1, a braking lining 2, a fixing member 3, a sectional shaft 4, an elastic member 5, a first engraved block 6, a second engraved block 7, a clutch base 8 and reduction box rear cover 9 as main components combined together.

The reduction box 1 secured on the power winch is installed in the interior with a reduction gear set, and has its outer side formed with an accommodating hollow 11 and its center bored with an insert hole for the motor spindle S to be inserted therethrough, as shown in FIG. 2.

The braking lining 2 shaped as a ring is assembled in the accommodating hollow 11 of the reduction box 1 and has its inner circumferential edge formed with a slope.

Figure 3:
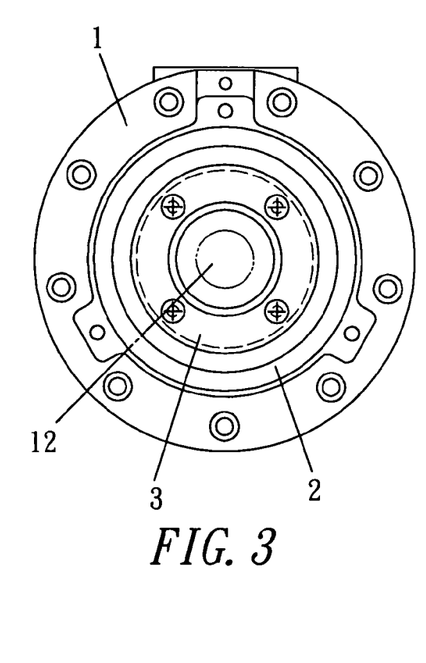
FIG. 3 is a side cross-sectional view of the first preferred embodiment of a reduction box, a braking lining and a fixing member combined together in the present invention.

The fixing member 3 to be received in the accommodating hollow 11 of the reduction box 1 is formed with a slanting outer circumferential edge 31 having the same gradient as that of the inner circumferential edge 21 of the braking lining 2 and able to firmly press against the inner edge 21 of the braking lining 2. The fixing member 3 is locked on the inner side of the accommodating hollow 11 of the reduction box 1 by means of bolts for pressing and fixing the braking lining, 2 in position, as shown in FIG. 3.

The sectional shaft 4 fitted on the motor spindle S (but unable to drive each other) is inserted in the insert hole 12 of the reduction box 1 and has the annular wall of its opposite ends formed with teeth 41. The teeth 41 on the annular wall of the end inserted in the insert hole 12 of the reduction box 1 are engaged with the reduction gear set in the reduction box 1 for rotating together.

The elastic member 5 is a volute spring fitted on the sectional shaft 4, having one end inserted and positioned in the hole 42 of the sectional shaft 4.

The first engraved block 6 is fitted on the sectional shaft 4 but unable to drive each other. The elastic member 5 has the other end inserted and positioned in the first engraved block 6. The first engraved block 6 is provided with an annular base 61 protruding outward on one side reverse to the elastic member 5. The annular base 61 is formed with plural corrugated slopes 611 and has its opposite outer walls respectively disposed with an actuating projection 612. Further, the first engraved block 6 has its outer circumferential edge formed with a slanting frictional surface 62 whose gradient is preferably the same as that of the inner circumferential edge 21 of the braking lining 2.

The second engraved block 7 is formed with a central hole having its inner wall provided with teeth 71 to be engaged with the teeth 41 on the annular wall of outer end of the sectional shaft 4 so as to enable the sectional shaft 4 and the second engraved block 7 to be rotated together. The second engraved block 7 is firmly positioned on the sectional shaft 4 by a set of C-shaped clasps 7A to prevent the second engraved block 7 from shifting. The second engraved block 7 is further provided with a slope 711 and two actuating projections 712 respectively corresponding with the slope 611 and the actuating projections 612 of the first engraved block 6, only there is slight angle error between the slopes 611, 711 and between the actuating projections 612, 712, such structure being the same as that of foresaid U.S. Pat. No. 6,520,486.

The clutch base 8 has its outer side bored with a central engage hole 81 to be firmly engaged with the outer end of the motor spindle S to enable the whole clutch base 8 to be actuated to rotate by the motor spindle S. The engage hole 81 of the clutch base 8 has its outer circumferential edge formed with a bush base 82 for fitting a shaft bush 8A thereon. The clutch base 8 further has its inner side disposed with a set of symmetrical projecting blocks 83, as shown in FIG. 2, for respectively pushing the actuating projections 612, 712 of the first and the second engraved block 6, 7 to rotate.

The reduction box rear cover 9 is fixed on the reduction box 1 and fitted with the shaft bush 8A of the clutch base 8 so that the shaft bush 8A can firmly hold the outer side of the clutch base 8 to let the clutch base 8 rotated with great steadiness.

To sling up the heavy loads, simply press a ascending button to let the motor spindle S and the clutch base 8 rotate together, and simultaneously one projecting block 83 of the clutch base 8 will push against the actuating projection 612, 712 of the first and the second engraved block 6, 7 and actuate the first and the second engraved block 6, 7 to rotate synchronously. At this time, the sectional shaft 4 will be actuated to rotate together with the second engraved block 7 to drive the reduction gear set to rotate and actuate the rope drum of the power winch to turn and retract the steel rope for slinging up the heavy loads. To lower down the heavy load (or only to release the steel rope), only press a descending button to let the motor spindle S rotate reversely for releasing the steel rope and lowering down the heavy loads.

During slinging up or lowering down heavy loads, the motor can be stopped operating by pressing a stopping key, and the motor will automatically stop operating when power outage happens. When the motor stops operating, the motor spindle S and the clutch base 8 will stop rotating immediately and the projecting blocks 83 of the clutch base 8 will also stop pushing the first and the second engraved block 6, 7. At the instant, a reverse torsional force produced by the heavy loads hung on the steel rope will force the second engraved block 7 to push the first engraved block 6 to move (this action being the same as that described in the U.S. Pat. No. 6,520,486) to let the frictional surface on the outer circumferential edge of the first engraved block 6 forced to closely contact with the slanting inner circumferential edge 21 of the braking lining 2 and produce friction for carrying out braking. Thus, the first and the second engraved block 6, 7, the clutch base 8, the sectional shaft 4, the motor spindle S and the steel rope as well as the heavy loads hung on the steel rope are all stopped operating, letting the whole power winch stop functioning.

Figures 4, 5:
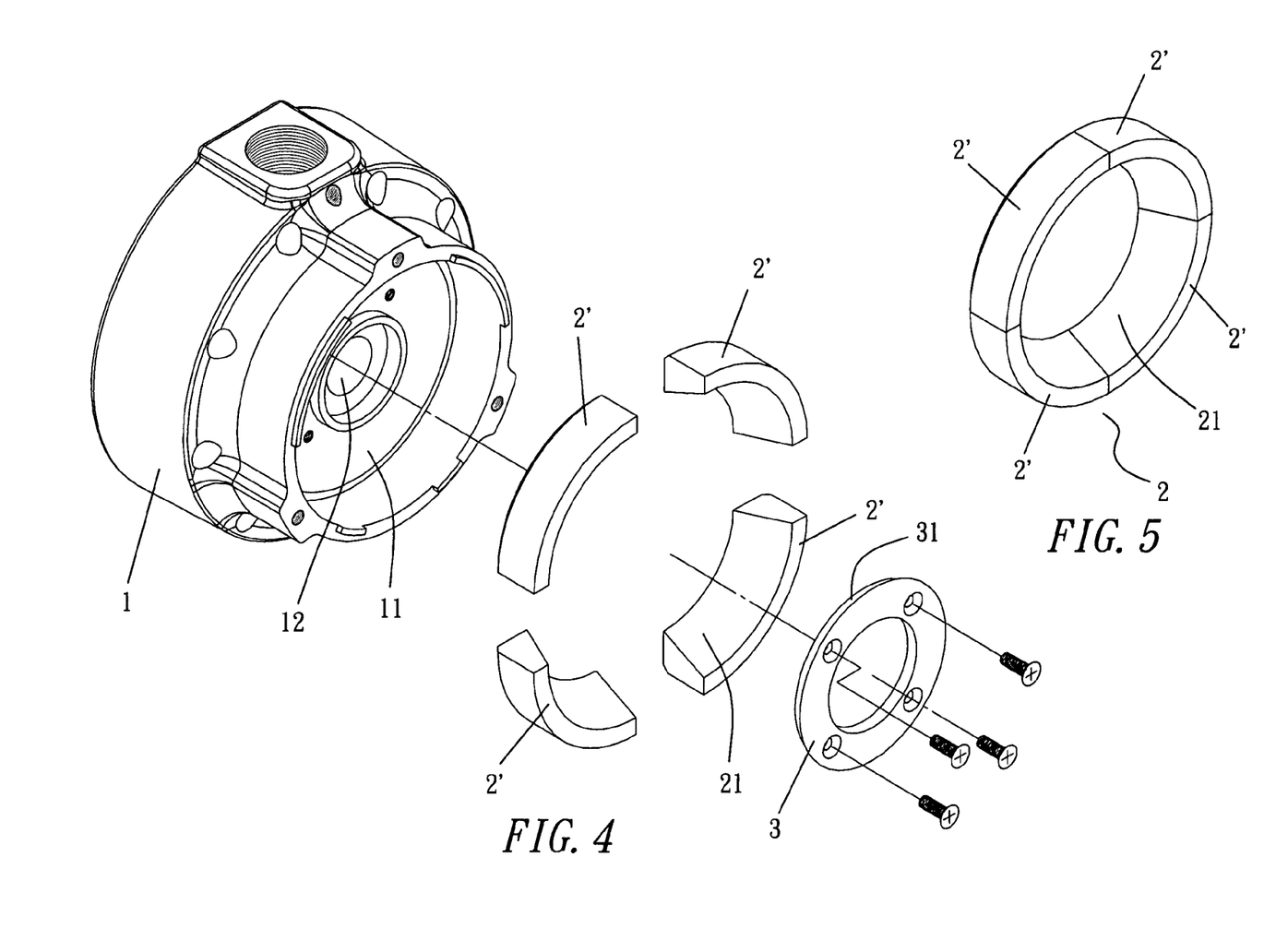
FIG. 4 is a partial exploded perspective view of a second preferred embodiment of a braking device for a power winch in the present invention.
FIG. 5 is a perspective view of the second preferred embodiment of a braking lining in the present invention.
Figure 6:
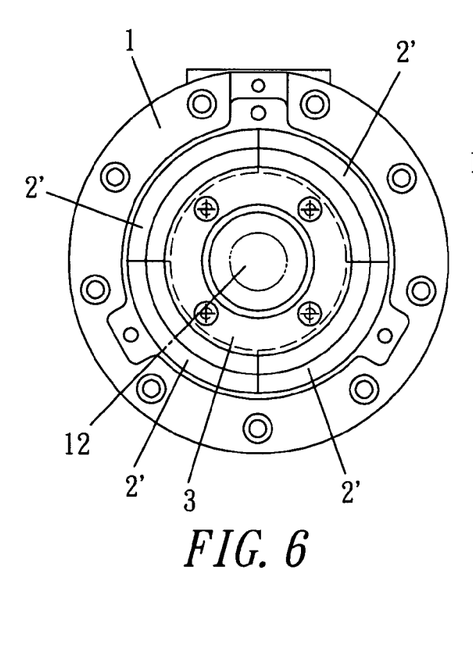
FIG. 6 is a side cross-sectional view of the second preferred embodiment of a reduction box, a braking lining and a fixing member combined together in the present invention.

A second preferred embodiment of a braking device for a power winch, as shown in FIG. 4, has almost the same structure and function as those described in the first preferred embodiment, except that the lining 2 is divided into several blocks 2' able to be integrated to form a ring-shaped braking lining 2, which is equally formed with a slanting inner circumferential edge 21, as shown in FIG. 5. After the blocks 2' are arranged and positioned in the accommodating hollow 11 of the reduction box 1 to form an integrated braking lining 2, the fixing member 3 has its outer circumferential edge 31 pressing the inner circumferential edge 21 of the braking lining 2 to fix the braking lining 2 in position, as shown in FIG. 6. In disassembling and replacing the braking lining 2 of the second preferred embodiment, the blocks 2' of the braking lining 2 can be disengaged from the reduction box 1 quickly and conveniently.

Figure 7:
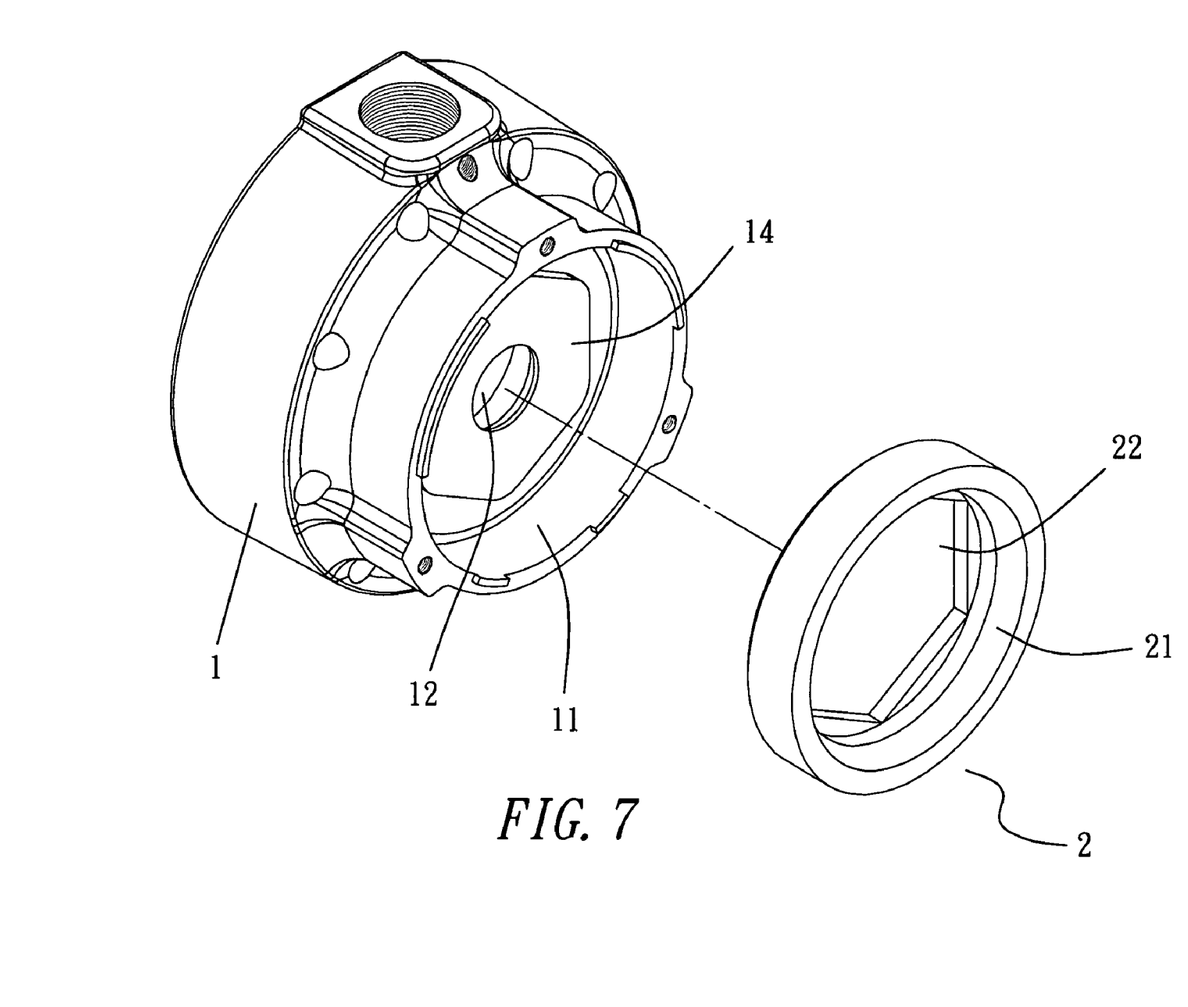
FIG. 7 is a partial exploded perspective view of a third preferred embodiment of a braking device for a power winch in the present invention.
Figure 8:
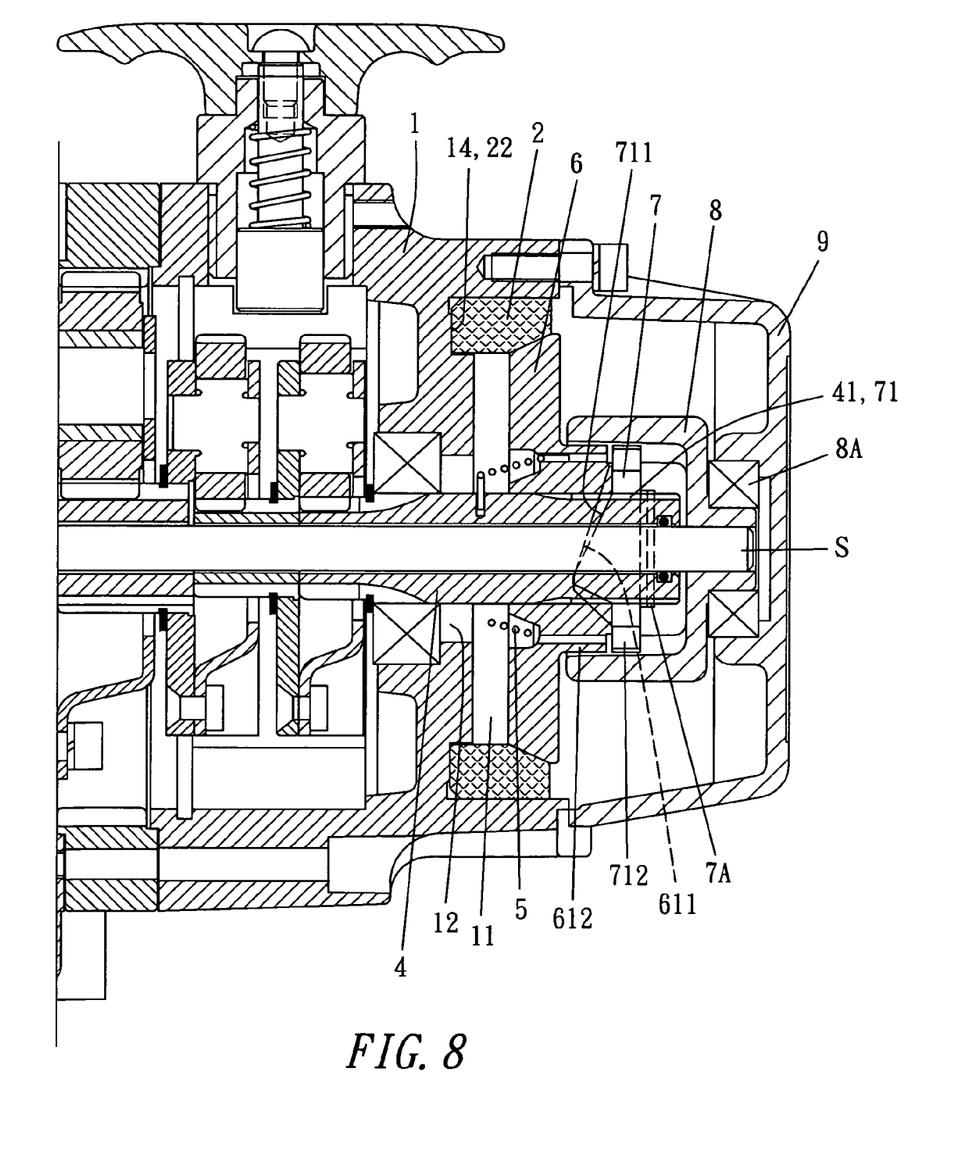
FIG. 8 is a cross-sectional view of the third preferred embodiment of the braking device for a power winch in the present invention.
Figure 9:
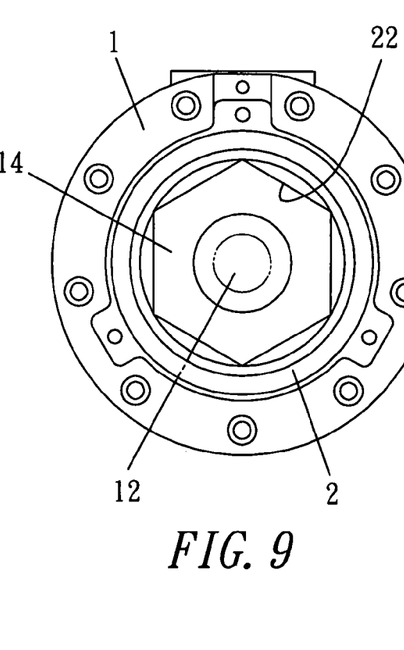
FIG. 9 is a side cross-sectional view of the third preferred embodiment of a reduction box and a braking lining combined together in the present invention.

A third preferred embodiment of a braking device for a power winch in the present invention, as shown in FIG. 7, has almost the same structure and function as those described in the first preferred embodiment, except that the braking lining 2 has its inner side provided with a polygonal combining groove 22 and the reduction box 1 has its accommodating hollow 11 provided with a correspondingly polygonal combining base 14 in the interior. The braking lining 2 equally has its inner circumference formed with a slanting edge 21. In assembling, as shown in FIGS. 8 and 9, only have the combining groove 22 of the braking lining 2 engaged with the combining base 14 in the accommodating hollow 11 of the reduction box 1 and thus the braking lining 2 can be firmly assembled with the reduction box 1, needless to employ the fixing member 3 for fixing the braking lining 2 as described in the first and the second preferred embodiment. To disassemble the braking lining 2, only pry off the braking lining 2 and remove it out of the accommodating hollow 11 of the reduction box 1.

As can be understood from the above description, this invention has the follow advantages.

1. The braking lining 2 is provided independently; therefore, when the motor is started to operate, even if the first and second engraved block 6, 7 are rotated, the braking lining 2 will not be actuated to rotate, able to prevent wear. Only when the motor stops operating and the frictional surface 62 of the first engraved block 6 is actuated to contact with the braking lining 2, can the braking lining 2 begin to function, able to avoid wear, enhance effect in use and prolong service life. In addition, if the braking lining 2 is damaged, only the braking lining 2 has to be replaced without involving other components, conforming to economic gain.

2. The braking lining 2 can be replaced with a new one quickly and easily, having great practicability.

While the preferred embodiments of the invention have been described above, it will be recognized and understood that various modifications may be made therein and the appended claims are intended to cover all such modifications that may fall within the spirit and scope of the invention.

I claim:

1. A braking device for a power winch comprising:

a reduction box secured on a power winch, said reduction box installed with a reduction gear set in the interior of said reduction box said reduction box having its outer side bored with an accommodating hollow and its center bored with an insert hole for a motor spindle to be inserted therethrough, said reduction gear set received in the interior of said insert hole;

a braking lining assembled and positioned in said accommodating hollow of said reduction box;

a sectional shaft fitted on said motor spindle and having a first end inserted in said insert hole of said reduction box, said sectional shaft having an annular wall of said first end and a second end formed with teeth, said teeth on said annular wall of said first end, which is inserted in said insert hole, engaged with said reduction gear set for rotating together;

an elastic member fitted on said sectional shaft, said elastic member having one end inserted and positioned in a hole of said sectional shaft;

a first engraved block fitted on said sectional shaft, said elastic member having a second end inserted and positioned in said first engraved block, said first engraved block disposed with a protruding annular base on one side reverse to said elastic member, said annular base formed with plural corrugated slopes and having its outer wall fixed with two symmetrical actuating projections, said first engraved block having its outer circumferential edge formed with a frictional surface to contact with said braking lining;

a second engraved block formed with a central hole having its inner wall provided with teeth to be engaged with said teeth on one said annular wall of said sectional shaft, said second engraved block provided with a slope and two actuating projections respectively corresponding with said plural corrugated slopes and said two actuating projections of said first engraved block, there being slight angle error between said slopes and between said actuating projections of said first and said second engraved blocks;

a clutch base bored with an engage hole in the center to be engaged with the outer end of said motor spindle, said engage hole having an outer circumferential edge formed with a bush base that fits a shaft bush thereon, said clutch base having its inner side disposed with two projecting blocks for pushing against said actuating projections of said first and said second engraved block;

a reduction box rear cover locked and positioned on said reduction box; and said braking lining being an independent component positioned in said accommodating hollow of said reduction box, said first engraved block pushed to move and have said frictional surface closely contacting with said braking lining to produce braking action when a motor stops operating.

2. The braking device for a power winch as claimed in claim 1, wherein after received in said accommodating hollow of said reduction box, said braking lining has its inner edge pressed by a fixing member, said fixing member locked with the inner side of said accommodating hollow for fixing said braking lining in position.

3. The braking device for a power winch as claimed in claim 1, wherein said braking lining can be divided into several blocks, which can be integrated to form a ring-shaped braking lining.

4. The braking device for a power winch as claimed in claim 1, wherein said braking lining is provided inside with a polygonal combining groove, and said accommodating hollow of said reduction box is provided inside with a corresponding polygonal combining base, said combining groove engaged with said combining base to firmly position said braking lining in said accommodating hollow of said reduction box.

* * * * *